(12) United States Patent
Sloan et al.

(10) Patent No.: US 9,303,375 B2
(45) Date of Patent: *Apr. 5, 2016

(54) CABLE BASED VEHICLE BARRIER FENCE

(71) Applicant: SLOAN SECURITY GROUP, INC, Boise, ID (US)

(72) Inventors: Gregory Jack Sloan, Boise, ID (US); Collin Ray Sloan, Boise, ID (US)

(73) Assignee: SLOAN SECURITY GROUP, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,246

(22) Filed: Mar. 12, 2015

(65) Prior Publication Data

US 2015/0191882 A1    Jul. 9, 2015

Related U.S. Application Data

(63) Continuation of application No. 14/166,725, filed on Jan. 28, 2014, now Pat. No. 8,992,116.

(60) Provisional application No. 61/757,419, filed on Jan. 28, 2013.

(51) Int. Cl.
| | |
|---|---|
| *E04H 17/04* | (2006.01) |
| *E04H 17/06* | (2006.01) |
| *E04H 17/12* | (2006.01) |
| *E01F 15/06* | (2006.01) |
| *E01F 13/12* | (2006.01) |

(52) U.S. Cl.
CPC .................. *E01F 15/06* (2013.01); *E01F 13/12* (2013.01); *E04H 17/04* (2013.01); *E04H 17/06* (2013.01); *E04H 17/12* (2013.01)

(58) Field of Classification Search
CPC ........... E01F 13/12; E01F 13/00; E01F 15/06; E04H 17/04; E04H 17/06; E04H 17/12
USPC .............................. 404/6, 9, 10; 256/13.1, 35
See application file for complete search history.

(56) References Cited

U.S. PATENT DOCUMENTS

| | | |
|---|---|---|
| 2,326,547 A | 8/1943 | McNabb |
| 3,254,383 A | 6/1966 | Ehmann |
| 3,535,751 A | 10/1970 | Batchelor |
| 3,600,765 A | 8/1971 | Rovinsky |
| 3,665,587 A | 5/1972 | Michaelsen |
| 6,065,738 A | 5/2000 | Pearce |
| 6,962,328 B2 | 11/2005 | Bergendahl |
| 7,686,535 B2 | 3/2010 | Bergendahl et al. |
| 7,883,075 B2 | 2/2011 | Abu-Odeh et al. |
| 7,913,981 B2 | 3/2011 | Rohde et al. |
| 8,083,433 B2 | 12/2011 | Neusch |
| 8,206,056 B2 | 6/2012 | O'Banion |
| 8,286,950 B2 | 10/2012 | Neusch |
| 8,448,913 B1 | 5/2013 | Rohde et al. |
| 2009/0121205 A1 | 5/2009 | Dallas |
| 2011/0057160 A1 | 3/2011 | Abu-Odeh et al. |
| 2012/0056143 A1 | 3/2012 | James |

OTHER PUBLICATIONS

"Choosing the Right Antiterrorism Crash Barrier," Security Management, http://www.securitymanagement.com/print/6399, Mar. 16, 2011.

*Primary Examiner* — Abigail A Risic
(74) *Attorney, Agent, or Firm* — Buchanan Nipper LLC

(57) ABSTRACT

A vehicle barrier fence for arresting an impacting vehicle of substantial mass within a selected distance of the fence. The fence having, in part: a retaining structure, at least one cable having a first end comprising a cable terminator, a post having an orifice defined there through sized to receive the cable terminator into the post, and a cable retainer for retaining the cable terminator within the post.

20 Claims, 15 Drawing Sheets

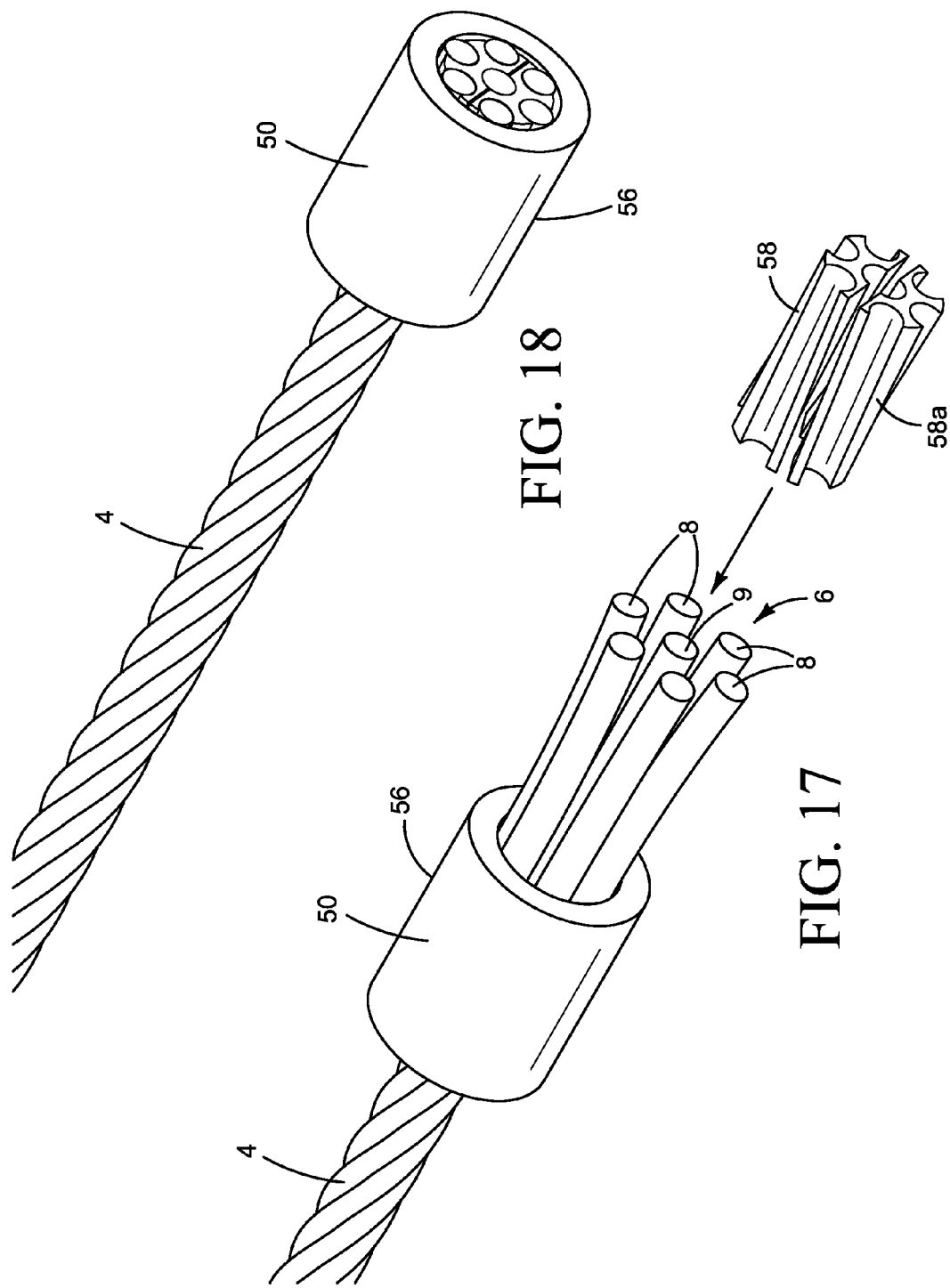

CABLE BASED VEHICLE BARRIER FENCE

PRIORITY/CROSS-REFERENCE TO RELATED APPLICATIONS

This application is a continuation application of application Ser. No. 14/166,725, filed Jan. 28, 2014, which claimed the benefit of U.S. Provisional Application No. 61/757,419, filed Jan. 28, 2013, the disclosures of which are incorporated herein by this reference.

TECHNICAL FIELD

The disclosure generally relates to the field of fencing. Particular embodiments relate to security fencing and barriers.

BACKGROUND

Disclosed herein are embodiments of a vehicle barrier fence designed to arrest an impacting vehicle of substantial mass within a selected distance of the fence. Control of vehicles is important in many situations. At high security locations there is a need to stop potential bomb carrying vehicles from penetrating the perimeter, and getting close enough to critical facilities to detonate and cause mass destruction. Another situation where this barrier might be utilized is as a roadway barrier for highway safety.

As discussed in "Choosing the Right Antiterrorism Crash Barrier," SECURITY MANAGEMENT, http://www.securitymanagement.com/article/choosing-right-antiterrorism-crash-barrier-006399, "[t]o keep the target facility far enough from devastating blast wave loads and to prevent similar tragedies as the Oklahoma City Bombing, a sufficient blast stand-off distance needs to be maintained, especially after terrorists try to crash their truck through any secured perimeter. Hence, physical perimeter barriers should fully stop any impacting vehicles while keeping explosives farther away from the target than any required minimum stand-off distance . . . US federal agencies have developed systematic test standards using real crash tests to quantify, verify, and certify barrier performance. Such test methods were initially published and maintained by the U.S. Department of State (DoS), Bureau of Diplomatic Security, in 1985 as SD-STD-02.01. It was revised in 2003 as SD-STD-02.01 Revision A, which has been gradually replaced since 2007, with ASTM F 2656-07 Perimeter Barrier Vehicle Crash Test Standard."

The effectiveness of vehicle barrier fencing is measured by a number of industry standards and government regulations which generally measure the distance a crash-testing vehicle penetrates the barrier fence. The standard for security barriers is clarified and designated, as further discussed in the aforementioned SECURITYMANAGEMENTarticle.

SUMMARY OF THE DISCLOSURE

Several exemplary vehicle barrier fences designed to arrest an impacting vehicle of substantial mass within a selected distance of the fence, and methods of installing the same, are described herein.

Additional understanding of the devices and methods contemplated and/or claimed by the inventors can be gained by reviewing the detailed description of exemplary devices and methods, presented below, and the referenced drawings.

An exemplary vehicle barrier fence comprises a retaining structure, a cable, a post, and a cable retainer. The cable has a first width. The cable has a first end extending to a second end. The second end is configured to be fixed to the retaining structure. The first end has a cable terminator with a second width. The second width is greater than the first width. The cable terminator has a proximal end and a distal end. The proximal end is nearer the second end than the distal end is to the second end. The post is positioned in and secured to the ground surface. The post is oriented in a spaced apart relationship from the retaining structure. The post has an internal cavity. The post has a first wall that has a connection orifice defined therethrough. The connection orifice is configured for receiving the cable terminator therethrough. The connection orifice is larger than the second width. The first wall has an outside surface and an inside surface. The cable retainer is configured for insertion between the distal end and the inside surface after the cable terminator has been inserted through the connection orifice and into the internal cavity. The cable retainer is for retaining the cable terminator within the internal cavity.

Another exemplary vehicle barrier fence is similar to the exemplary vehicle barrier fence described above, wherein the retaining structure is a second post.

Another exemplary vehicle barrier fence is similar to the exemplary vehicle barrier fence described above, wherein after the cable is tensioned, at least a portion of the internal cavity is filled with concrete.

Another exemplary vehicle barrier fence is similar to the exemplary vehicle barrier fence described above, wherein the cable retainer comprises a body having a first side. The first side comprises a slot defined therein. The slot has a slot width larger than the cable width. The slot has a slot width narrower than the cable terminator width. The slot is configured for sliding onto the cable between the cable terminator distal end and the post inside surface after the cable terminator has been inserted through the connection orifice and into the internal cavity, thereby retaining the cable terminator within the internal cavity. In this exemplary vehicle barrier fence, optionally the cable retainer can comprise at least one recess configured for receiving a working face of a linear actuator therein.

Another exemplary vehicle barrier fence is similar to the exemplary vehicle barrier fence described above, further comprising a tensioner for spacing the cable terminator away from the inside surface of the post, thereby tensioning the cable. In this exemplary vehicle barrier fence, optionally the tensioner further comprises at least one passageway defined through the first wall, the passageway configured for receiving therein a linear actuator configured for spacing the cable terminator away from the inside surface of the post, thereby tensioning the cable. Further optionally, at least a portion of the passageway is threaded, and the linear actuator comprises a threaded shaft.

Further optionally, the linear actuator comprises a first bolt configured for contacting the cable retainer. Turning the first bolt advances the first bolt in the threaded passageway. The first bolt being configured for pushing the cable retainer and cable terminator away from the inside surface of the post, thereby tensioning the cable.

Further optionally, the tensioner further comprises a second passageway defined through the first wall. The second passageway configured for receiving therein a second bolt configured for spacing the cable terminator away from the inside surface of the post. At least a portion of the second passageway is threaded. The second bolt comprises a threaded shaft. The second bolt is configured for contacting the cable retainer. Turning the second bolt advances the second bolt in the threaded passageway. The bolt is configured for pushing the cable retainer and cable terminator away from the inside surface of the post, thereby tensioning the cable.

Further optionally, the passageway comprises a first passageway defined through the first wall, and a second threaded passageway defined through an outside plate. The outside plate is fixed to the outside surface of the post.

Another exemplary vehicle barrier fence is similar to the exemplary vehicle barrier fence described above, wherein the post further comprises a first slit defined through the first wall. The first slit having a slit width wider than the cable width, and a slit width narrower than the cable terminator width. The first slit configured for receiving the cable after the cable terminator is inserted through the connection orifice. Optionally, the post further comprises a second slit defined through the first wall. This second slit having a slit width wider than the first width, and a width narrower than the second width. The second slit is configured for receiving a second cable after a second cable terminator is inserted through the connection orifice. Optionally, the first slit is on a first side of the connection orifice, and the second slit is on a second side of the connection orifice. The first and second slits having centers, as does the connection orifice. The centers of the first slit, the second slit, and the connection orifice are oriented in the same plane as one another. Optionally, the plane of the first slit, the second slit and the connection orifice is perpendicular to a ground surface of the ground the post is positioned in.

Further optionally, the vehicle barrier fence comprises a second cable and a second cable retainer. The second cable having a first width, and a first end extending to a second end. The second end configured to be fixed to the retaining structure. The first end comprises a second cable terminator having a second width that is greater than the first width. The second cable terminator having a proximal end and a distal end. The proximal end is nearer the second end than the distal end is to the second end. The second cable retainer configured for insertion between the second cable terminator distal end and the inside surface after the second cable terminator has been inserted through the connection orifice and into the internal cavity. The second cable retainer for retaining the cable terminator within the internal cavity. Optionally, the second cable retainer comprises a body having a first side. The first side comprises a slot defined therein, the slot having a width larger than the cable width, and a width narrower than the second cable terminator width. The slot configured for sliding onto the cable between the second cable terminator distal end and the post inside surface after the second cable terminator has been inserted through the connection orifice and into the internal cavity thereby retaining the second cable terminator within the internal cavity. Optionally, the vehicle barrier fence further comprises a tensioner for spacing the second cable terminator away from the inside surface of the post, thereby tensioning the second cable. Optionally, the vehicle barrier fence further comprises a saddle plate connecting with the cable terminators and positioning them a predetermined space apart. Optionally, the cable terminator comprises a ferrule and at least one wedge block.

Methods of installing a vehicle barrier fence are also described.

Additional understanding of the devices and methods contemplated and/or claimed by the inventors can be gained by reviewing the detailed description of exemplary devices and methods, presented below, and the referenced drawings.

BRIEF DESCRIPTION OF THE DRAWINGS

FIG. 17 is an exploded view of one exemplary cable termination.

FIG. 18 is an assembled view of the exemplary cable termination of FIG. 11.

DETAILED DESCRIPTION

The following description and the referenced drawings provide illustrative examples of that which the inventors regard as their invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," "for example," and "or" and grammatically related terms indicates non-exclusive alternatives without limitation, unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise. Thus, for example, reference to "a ferrule" includes two or more such ferrules, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

Figure 1:
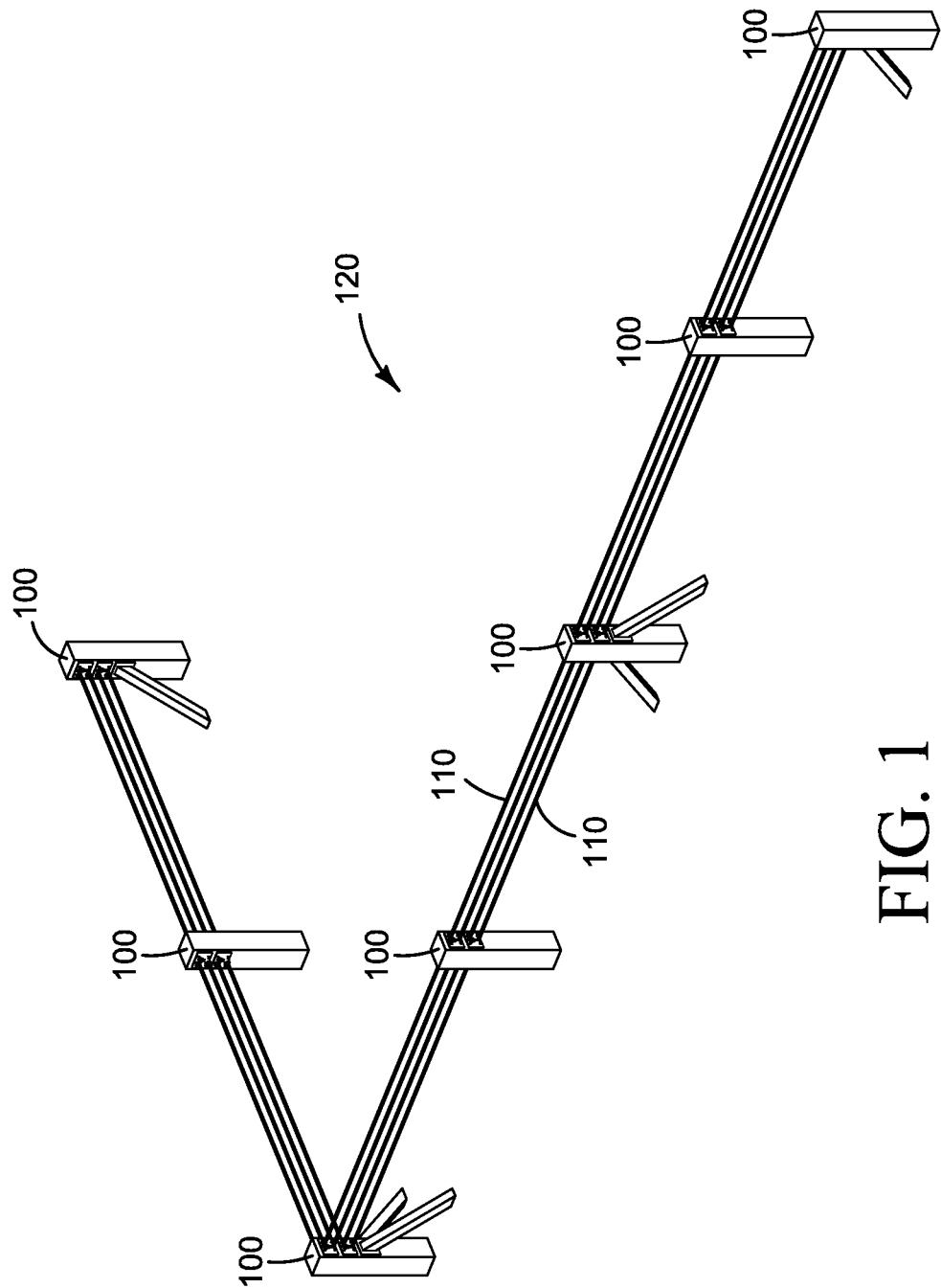
FIG. 1 is an environmental view of a first exemplary vehicle barrier fence.

FIG. 1 illustrates a first exemplary vehicle barrier fence 120. The vehicle barrier fence 120 is designed to arrest an impacting vehicle of substantial mass within a selected distance of the fence 120. The vehicle barrier fence 120 comprises a plurality of terminal posts 100 which are separated from one another by a desired distance (e.g., ten feet apart, one hundred feet apart, six hundred feet apart). Adjacent posts 100 are interconnected to one another by a plurality of cables 110. The posts 100 preferably connected to each other via from two to six wire ropes (aka "cables"). The number of cables needed, and the width and structure thereof, can vary based upon what fence requirements are needed for a particular installation. The posts function as retaining structures for anchoring the vehicle barrier fence. Other non-post retaining structures could also be used as a "retaining structure" (e.g., anchoring to a building, anchoring to a dead-man anchor, anchoring to a structure).

Some posts can comprise structural posts for supporting the cables, which extend therethrough, above a ground surface, assisting the terminal posts in taking up some of the load associated with the vehicle impact, and keeping the cable from sagging out of the proper alignment. Support posts can utilize a bracket that allows the cable to be supported during installation. A cover plate can then be installed to keep the cable from separating under vehicle load. Such a bracket can be attached to a small post, such as 2" schedule 40 Steel, set in a concrete footing with u-bolts allowing the bracket to be adjusted for elevation. After final cable elevation is reached, a self-drilling screw can be inserted through the bracket into the post to keep the bracket from slipping.

Such posts can be are installed at the spacing shown below in Table 1. All dimensions listed in Table 1 are preliminary and could change subject to testing.

TABLE 1

| Crash Barrier Rating: | Terminal Post Spacing | Line Post Spacing | Support Posts Spacing |
|---|---|---|---|
| M50 P1 | 60' center to center | 20' center to center | 20' |
| M50 P2 | 600' center to center | 200' center to center | 20' |

Figure 2:
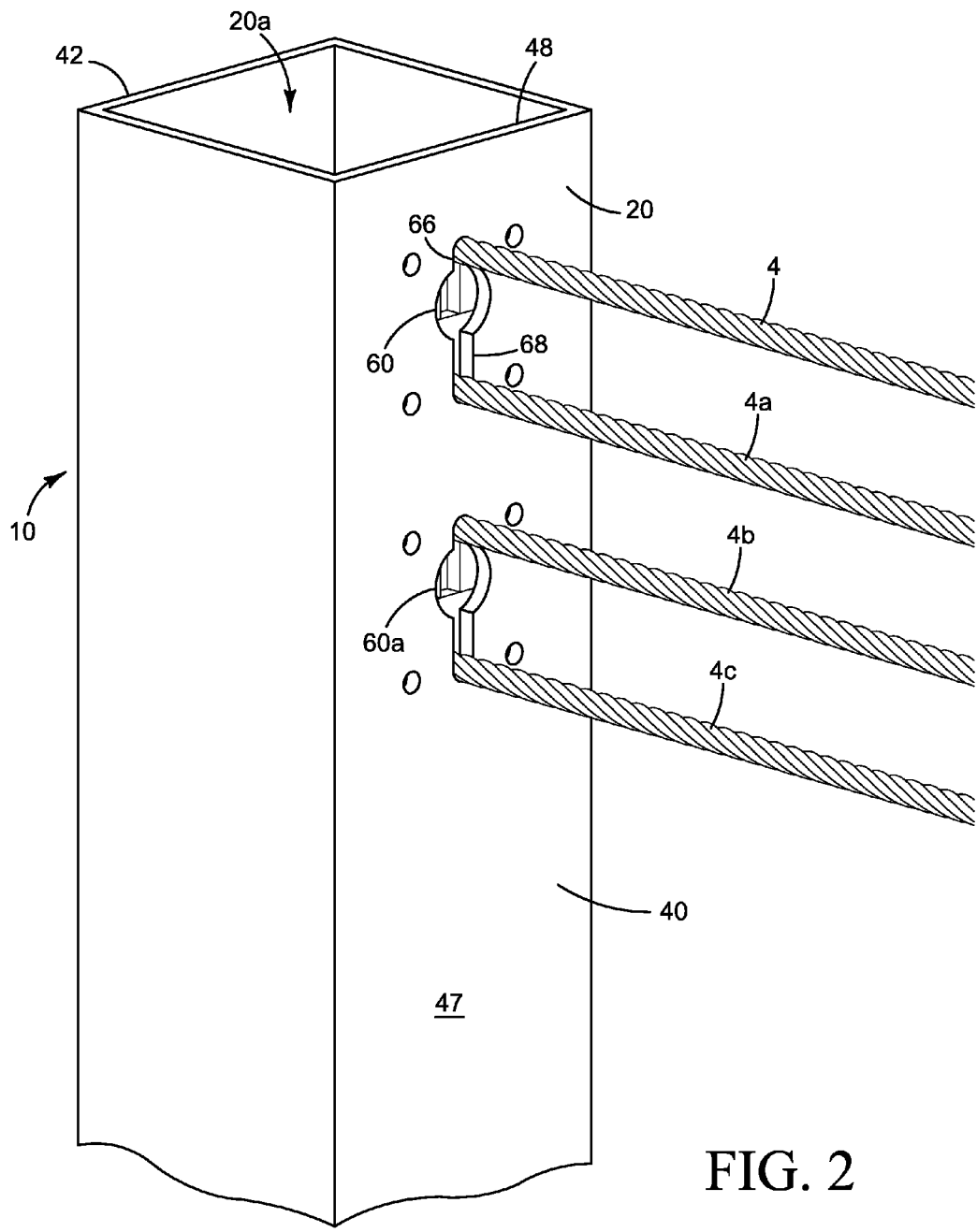
FIG. 2 is a perspective front side view of a post for a second exemplary vehicle barrier fence.
Figure 3:
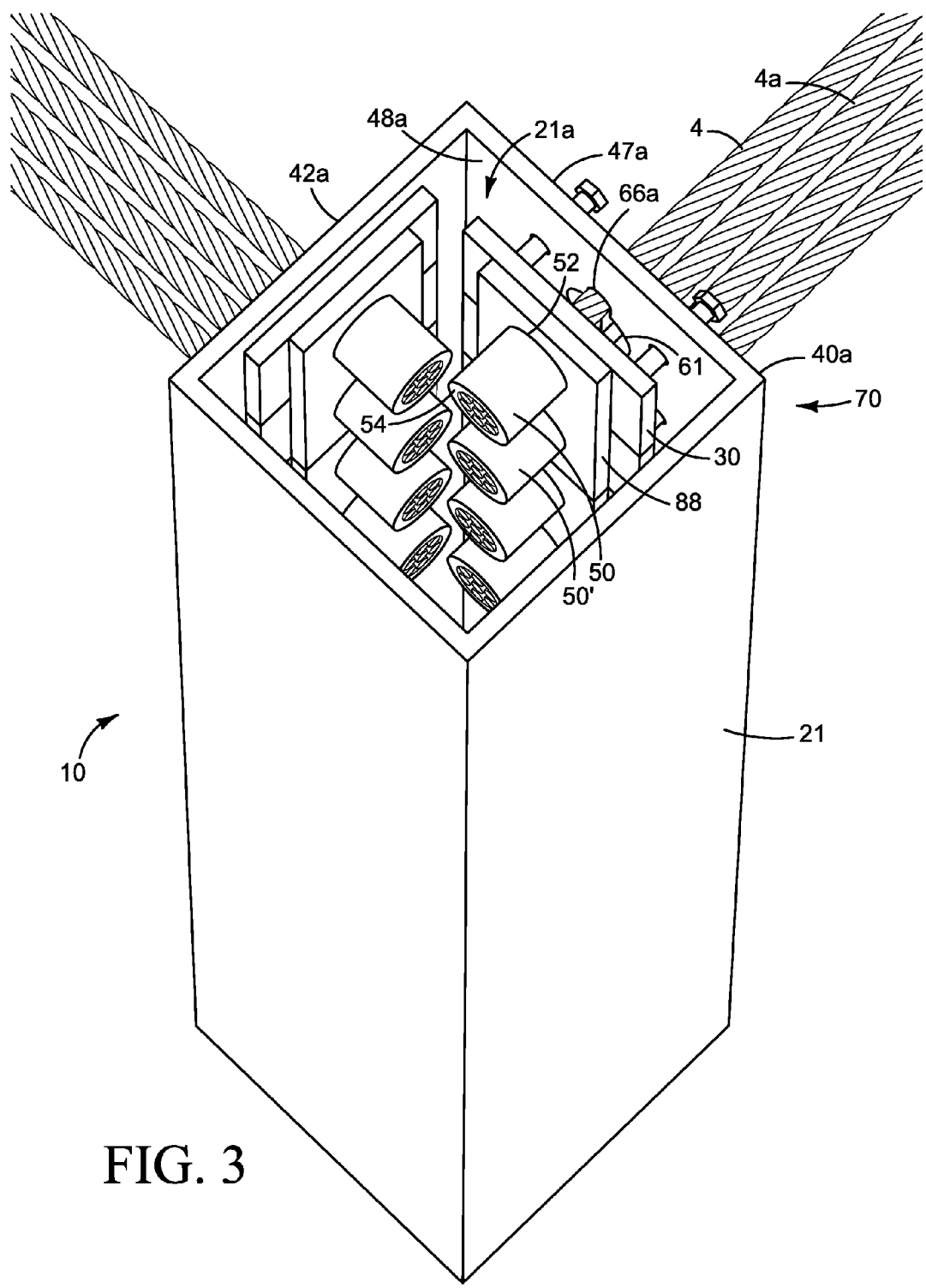
FIG. 3 is a top perspective view of a post for a third exemplary vehicle barrier fence.
Figure 4:
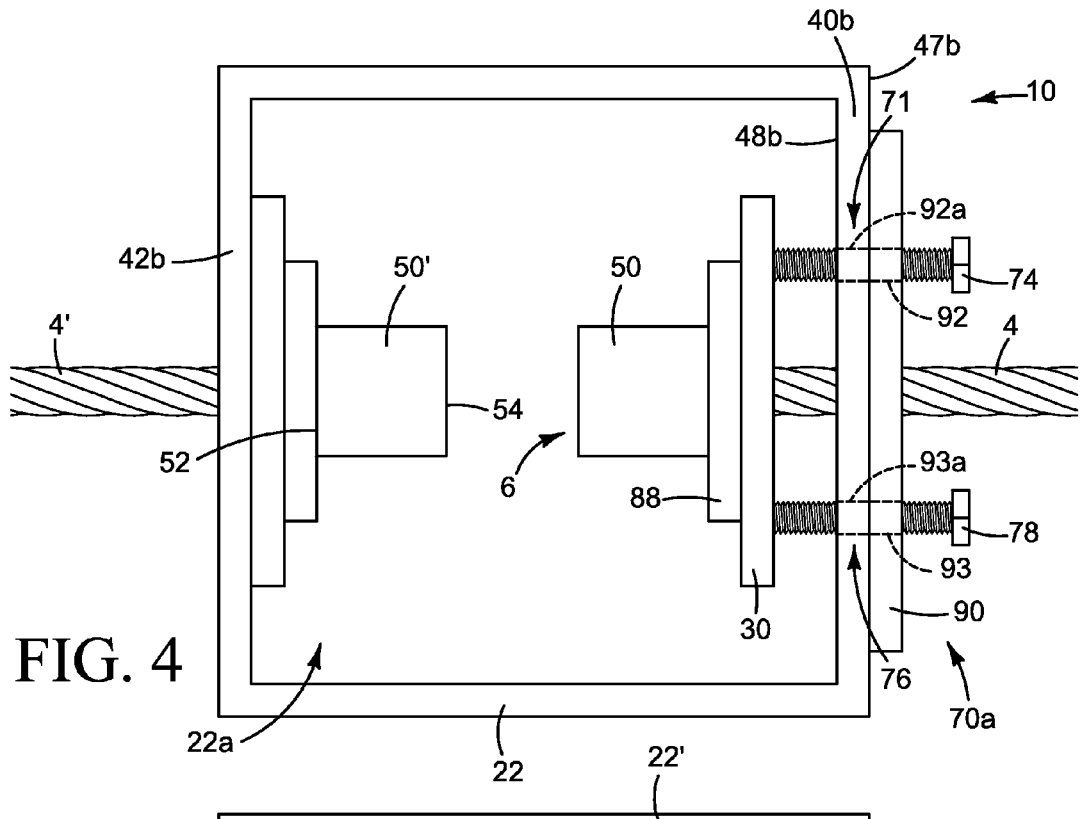
FIG. 4 is a top plan view of a post for a fourth exemplary vehicle barrier fence.
Figure 5:
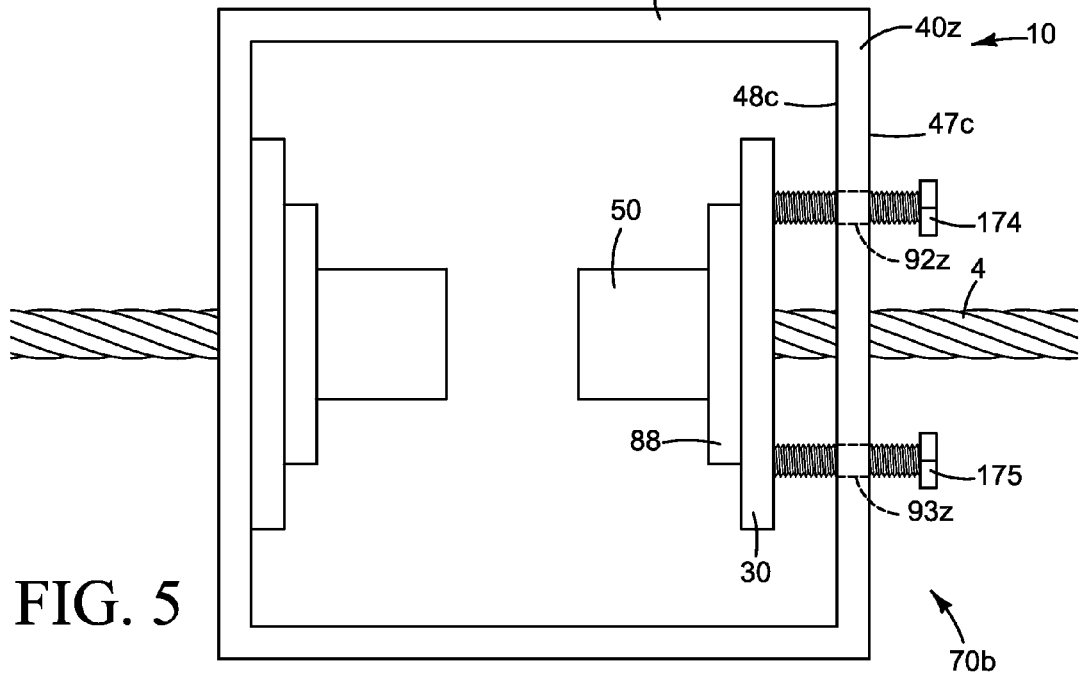
FIG. 5 is a top plan view of a post for a fifth exemplary vehicle barrier fence.
Figure 6:
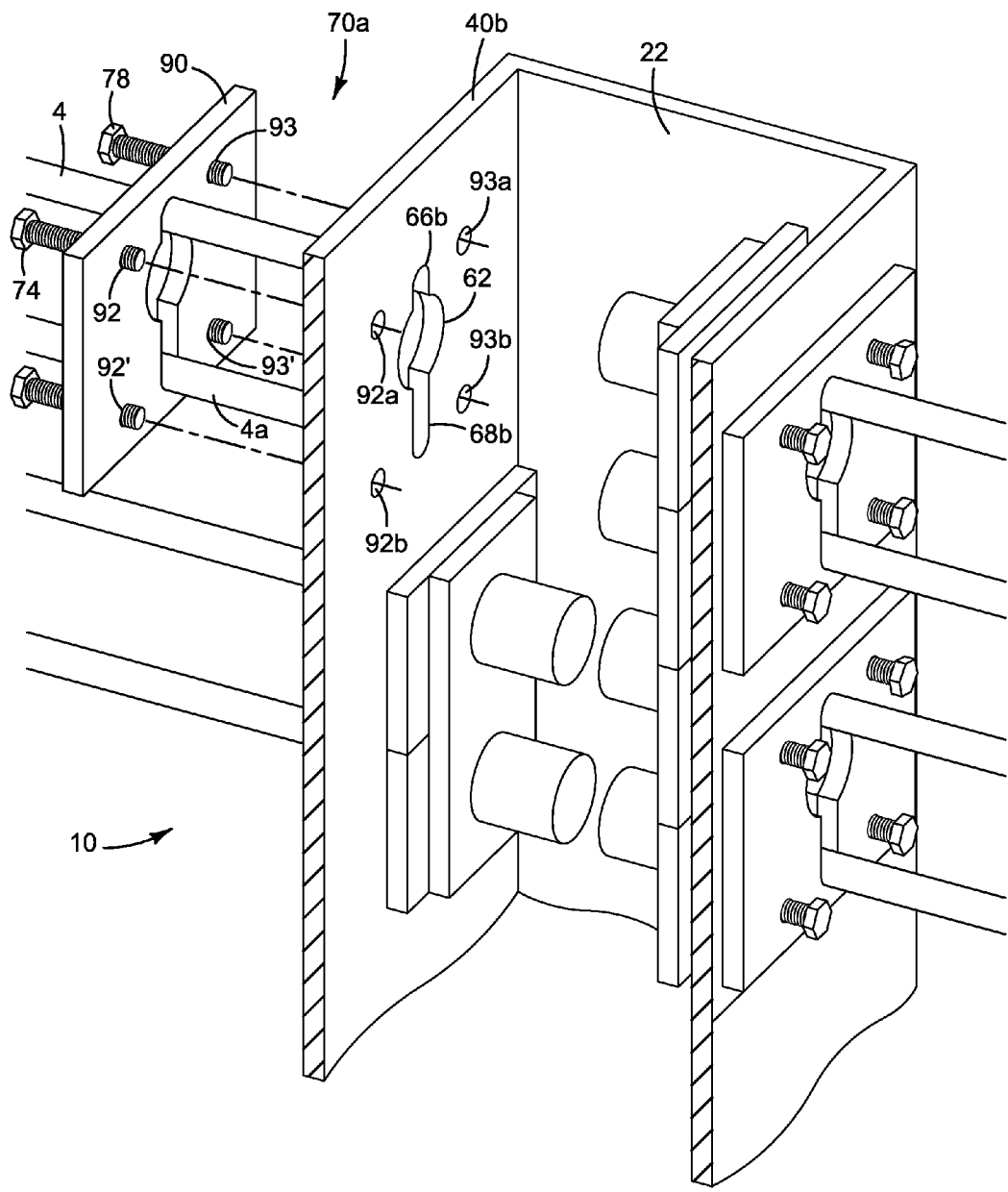
FIG. 6 is a first sequential perspective side view of the fourth exemplary vehicle barrier fence.
Figure 11:
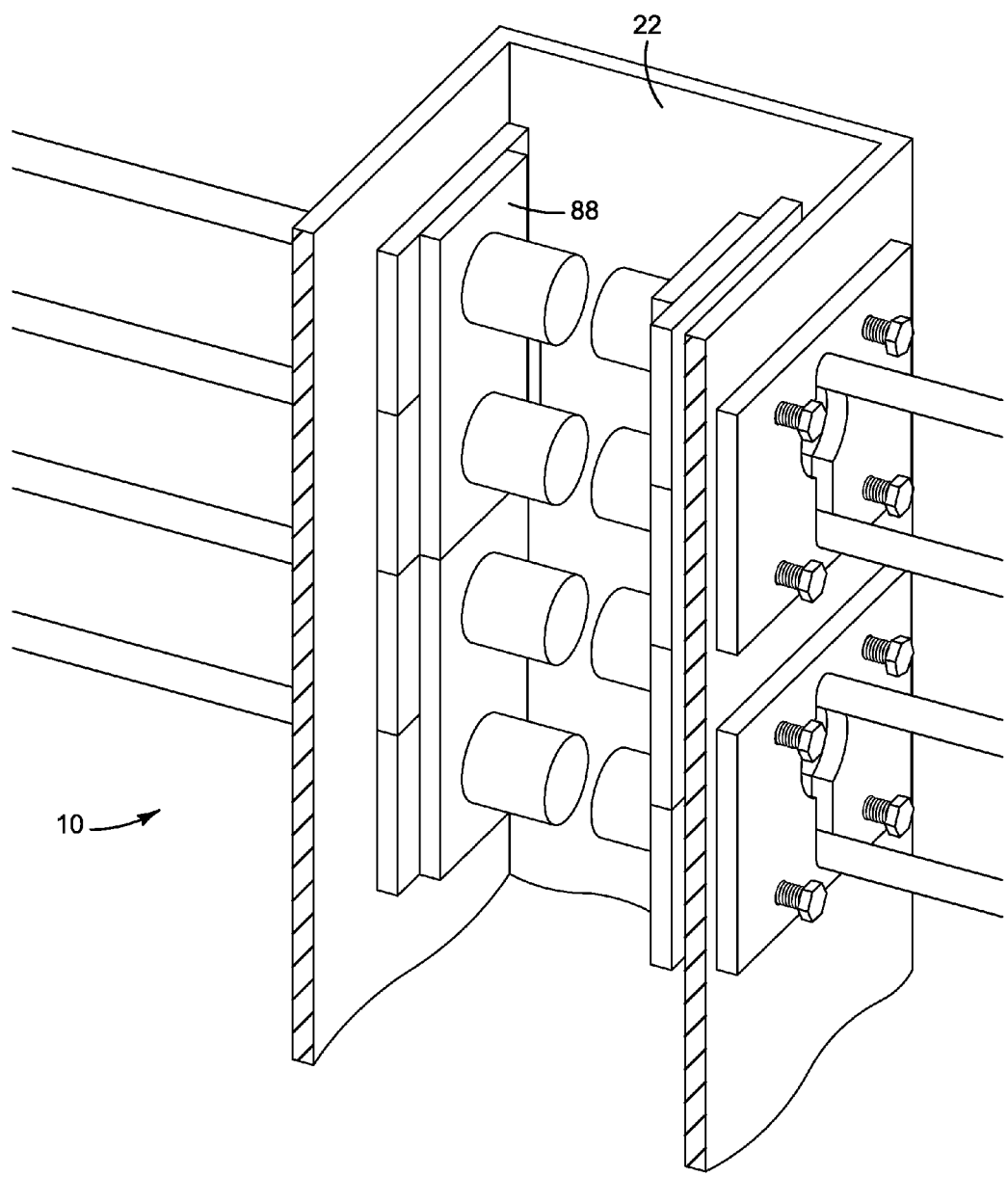
FIG. 11 is a sixth sequential perspective side view of the fourth exemplary vehicle barrier fence.
Figure 12:
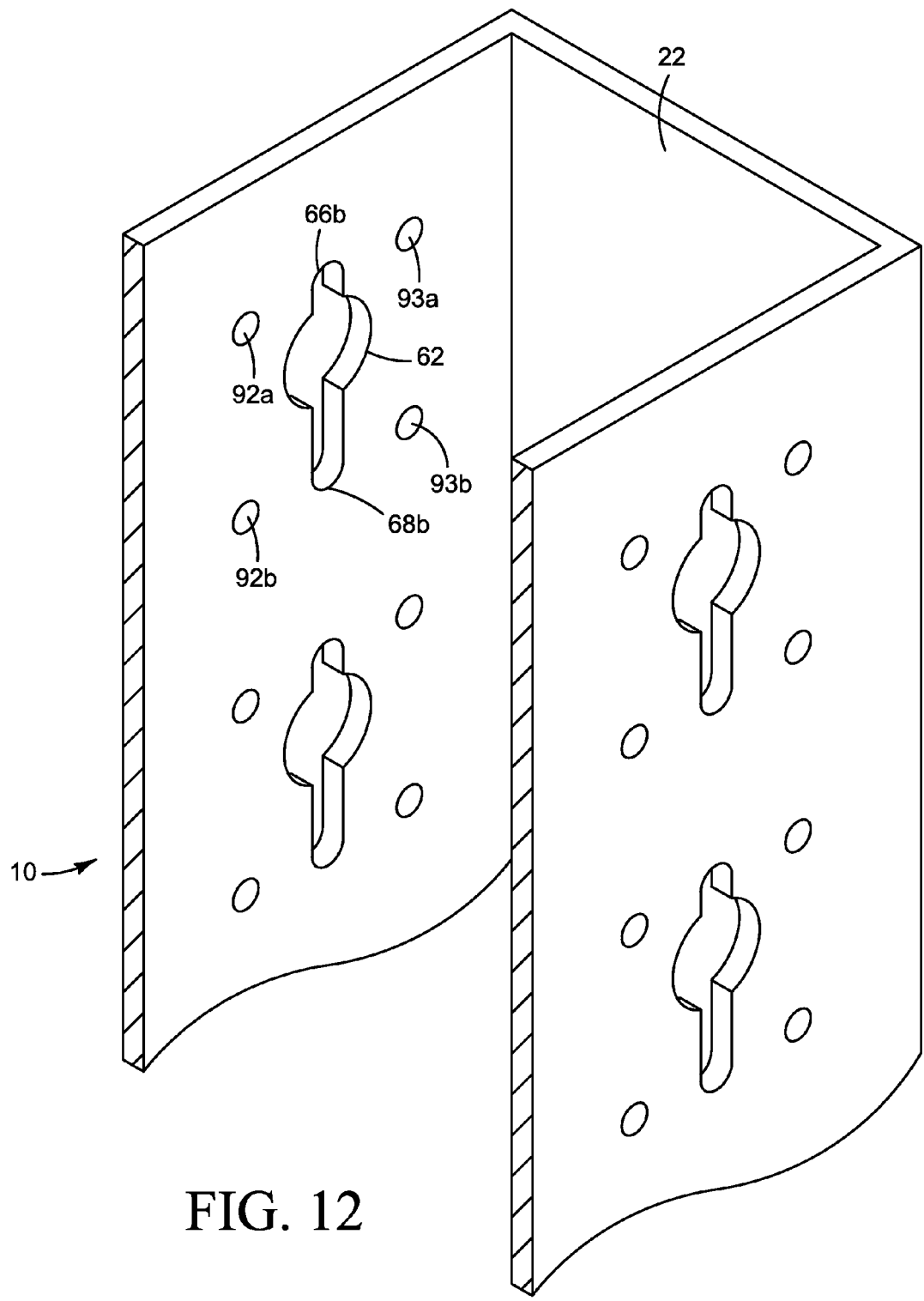
FIG. 12 is a perspective side view of the fourth exemplary vehicle barrier fence post.
Figure 13:
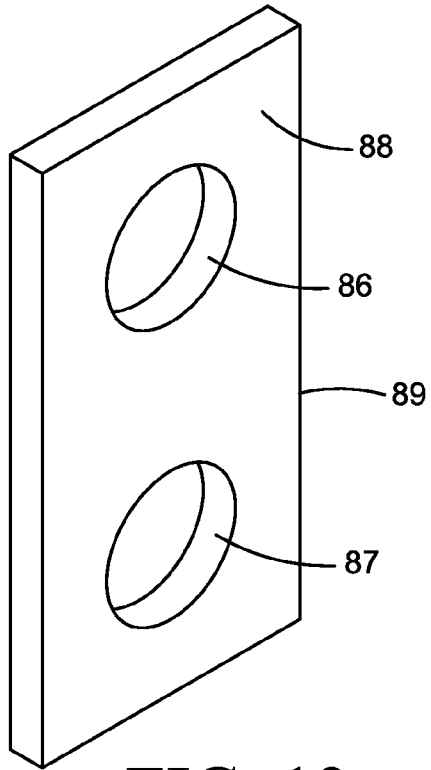
FIG. 13 is a front perspective view of one exemplary saddle plate.
Figure 14:
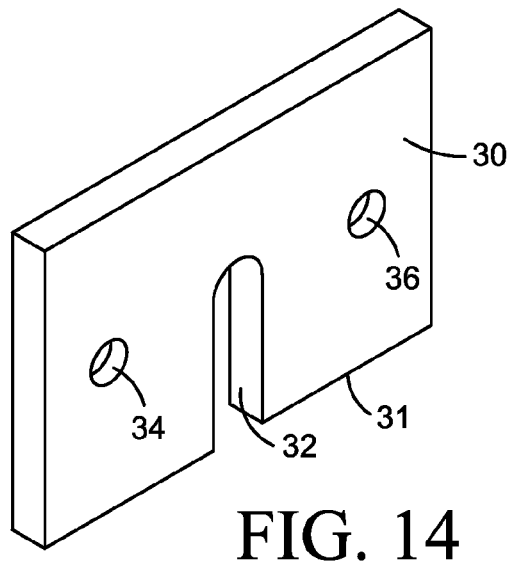
FIG. 14 is a front perspective view of a first exemplary cable retainer.
Figure 15:
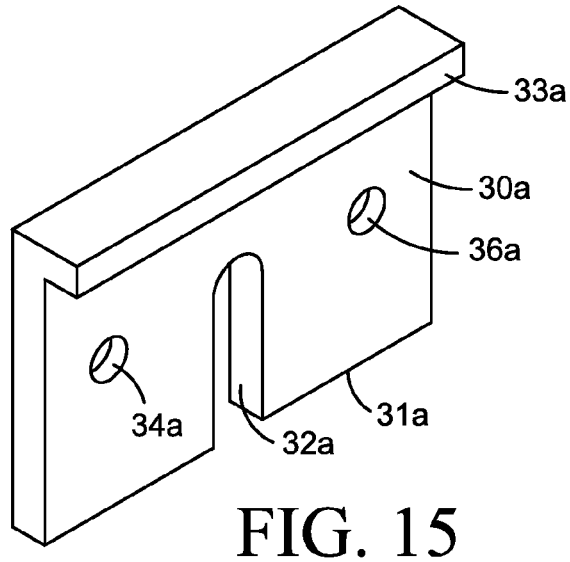
FIG. 15 is a front perspective view of a second exemplary cable retainer.
Figure 16:
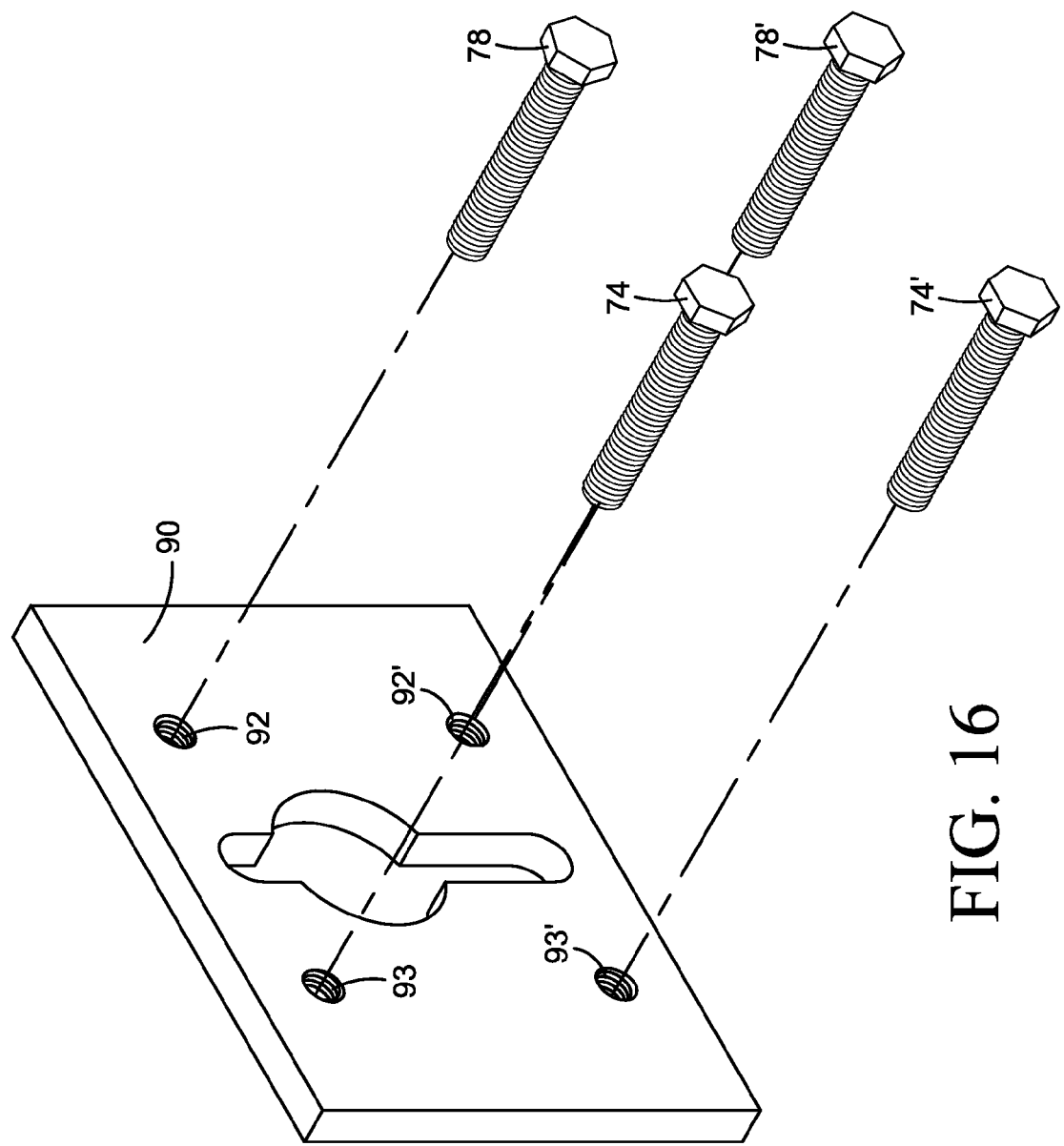
FIG. 16 is a front perspective vice of a first exemplary outer plate.
Figure 19:
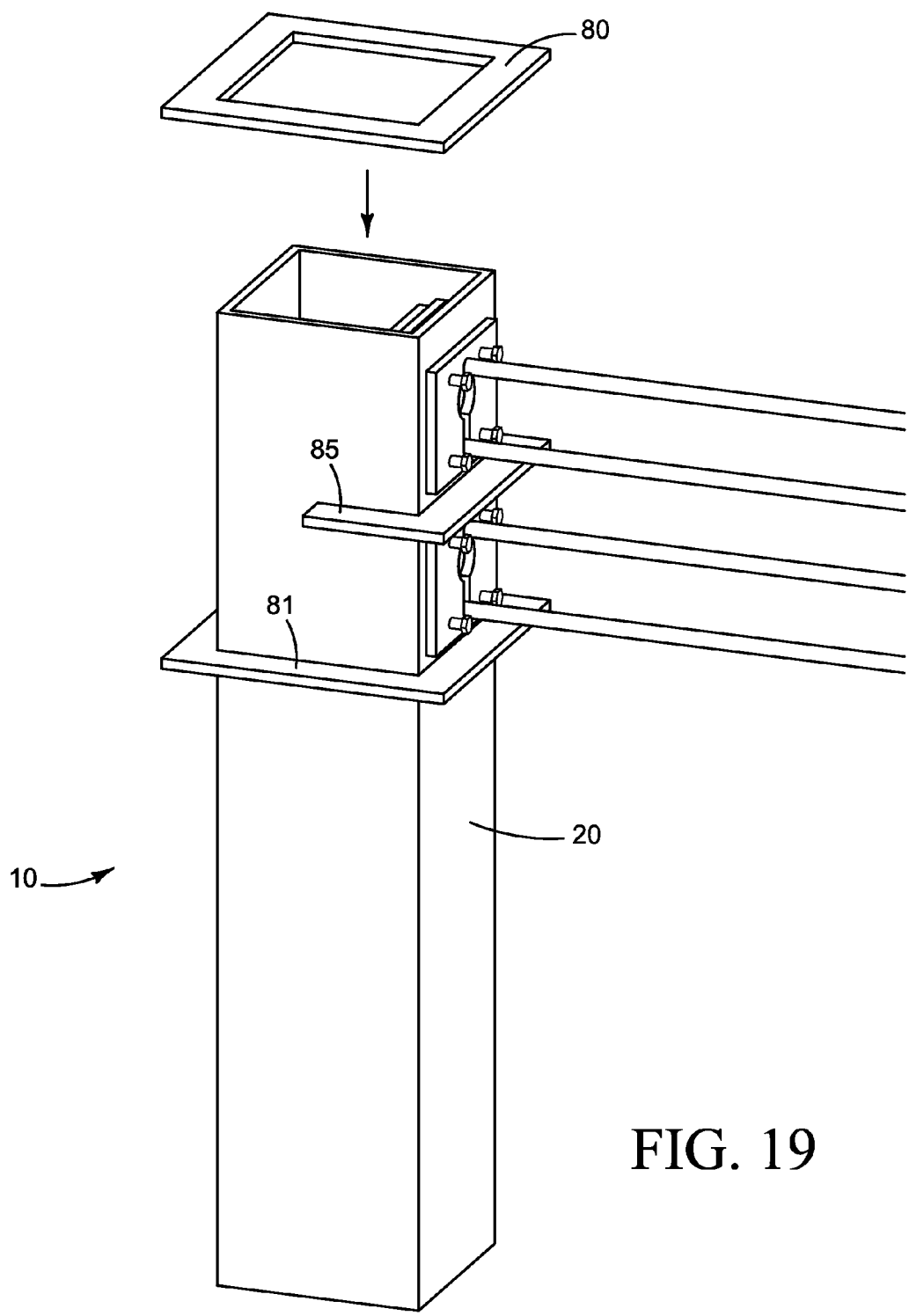
FIG. 19 is a side perspective view of a post for a sixth exemplary vehicle barrier fence post illustrating lateral stiffeners.

FIGS. 2 through 12 illustrate various views of a second exemplary vehicle barrier fence 10. FIG. 2 illustrates an end post 20, FIG. 3 illustrates a corner post 21, and FIGS. 4 through 12 illustrate center posts 22, 22', with FIGS. 6 through 12 illustrating an exemplary assembly procedure for the second exemplary vehicle barrier fence 10 which includes a post 22. FIG. 13 illustrates an exemplary saddle plate. FIGS. 14 and 15 illustrate two exemplary cable retainers 30, 30a. FIG. 16 illustrates an exemplary outside plate 90. FIGS. 17 and 18 illustrate an exemplary assembly procedure for an exemplary cable terminator. FIG. 19 illustrates lateral stiffeners. Unless the specification and figures clearly dictate otherwise, the various components illustrated with respect to one of said figures likewise applies to the other of said figures. For instance, in FIG. 2, the internal components are not visible, but are the equivalent of what is illustrated in FIG. 6. Further, reference to the components and/or structure of one particular post illustrated or described herein equally applies to the other posts unless, the specification or drawings implicitly or explicitly indicate otherwise. For instance, the description of connection orifice 60 likewise applies to connection orifice 61, unless the specification or drawings implicitly or explicitly indicate otherwise.

The vehicle barrier fence 10 comprises a retaining structure (such as an adjacent post), at least one cable (4, 4a, 4b, 4c), at least one post (20, 21, 22, 22a) and at least one cable retainer 30, 30a.

Cable 4 (4a, 4b, 4c) having a first width, and a first end 6 extending to a second end. The second end (not illustrated) is configured to be fixed to the retaining structure (e.g., an adjacent post). The second end may be identical in configuration to the first end 6.

The first end 6 comprising a cable terminator 50. The cable terminator 50 has a second width being greater than the cable's first width. The cable terminator 50 having a proximal end 52 and a distal end 54. The proximal end 52 is nearer the second end than the distal end 54 is to the second end. Conversely, the proximal end 52 is further from the first end 6 than the distal end 54 is to the first end 6.

The post (20, 21, 22, 22a) is configured to be positioned in, and secured to, the ground, for instance by embedding a bottom end of the post within a concrete filled hole. As illustrated in FIG. 1, the posts are preferably positioned in a spaced apart relationship from one another (and any retaining structure).

Referring to FIG. 2, illustrated is an end post 20 which comprises an internal cavity 20a. The end post 20 comprising a rectangular post having four side walls, including a first wall 40 and a second wall 42. Each of the walls having an outside surface and an inside surface. For instance, first wall 40 has an outside surface 47 and an inside surface 48. The first wall 40 having at least one connection orifice (60, 60a) defined therethrough. The connection orifice (60, 60a) sized for receiving a cable terminator 50 of a cable 4 therethrough.

The post 20 further comprising a first slit 66 defined through the first wall 40. The first slit 66 having a slit width which is wider than the width of the cable 4 but narrower than the width of the cable terminator (not illustrated). The first slit 66 is configured for receiving the cable 4 therein after the cable terminator (not illustrated) is inserted through the connection orifice 60. The post 20 further comprising a second slit 68 defined through the first wall 40. The second slit 68 having a slit width which is wider than the width of the cable 4, but narrower than the width of the cable terminator 50. The second slit 68 is configured for receiving a second cable 4a after a second cable terminator (not illustrated) is inserted through the connection orifice 60. Preferably, the first slit 66 is on a first side of the connection orifice 60, and the second slit 68 is on a second side of the connection orifice 60. The first slit 66, the second slit 68, and the connection orifice 60 having centers, wherein the centers are oriented in the same plane as one another. It is further preferred that the plane of the first slit 66, the second slit 68 and the connection orifice 60 be perpendicular to the ground surface of the ground the post is positioned in.

Referring now to FIG. 3, illustrated is a corner post 21 which comprises an internal cavity 21a. The corner post 21 comprising a rectangular post having four side walls, including a first wall 40a and a second wall 42a. Each of the walls having an outside surface and an inside surface. For instance, first wall 40a has an outside surface 47a and an inside surface 48a. The first wall (40, 40a, 40b, 40c) having two connection orifices 61, 61a (not illustrated) defined therethrough. The connection orifices 61, 61a sized for receiving a cable terminator 50 of a cable 4 therethrough.

The post 21 further comprising a first slit 66a defined through the first wall 40a. The first slit 66a having a slit width which is wider than the width of the cable 4 but narrower than the width of the cable terminator 50. The first slit 66a is configured for receiving the cable 4 therein after the cable terminator 50 is inserted through the connection orifice 61. The post 20a further comprising a second slit (not illustrated) defined through the first wall 40a. The second slit having a slit width which is wider than the width of the cable 4, but narrower than the width of the cable terminator 50. The second slit is configured for receiving a second cable 4a after a second cable terminator 50' is inserted through the connection orifice (not illustrated). Preferably, the first slit 66a is on a first side of the connection orifice 61, and the second slit is on a second side of the connection orifice 61. The first slit 66a, the second slit, and the connection orifice 61 having centers, wherein the centers are oriented in the same plane as one another. It is further preferred that the plane of the first slit 66a, the second slit and the connection orifice 61 be perpendicular to the ground surface of the ground the post is positioned in.

Referring now to FIG. 4, illustrated is a center post 22 which comprises an internal cavity 22a. The center post 22 having at least one side wall, for instance, the center post 22 comprising a rectangular post having four side walls, including a first wall 40b and a second wall 42b. Each of the walls having an outside surface and an inside surface. For instance, first wall 40b has an outside surface 47b and an inside surface 48b. The first wall 40b and second wall 42b each having at least one connection orifice (not illustrated) defined therethrough. The connection orifice sized for receiving a cable terminator 50 (50') of a cable 4 (4') therethrough.

The post 22 further comprising a first slit 66b defined through the first wall 40b. The first slit 66b having a slit width which is wider than the width of the cable 4 but narrower than the width of the cable terminator (not illustrated). The first slit 66b is configured for receiving the cable 4 therein after the cable terminator (not illustrated) is inserted through the connection orifice 62. The post 22 further comprising a second slit 68b defined through the first wall 40b. The second slit 68b having a slit width which is wider than the width of the cable 4, but narrower than the width of the cable terminator 50. The second slit 68b is configured for receiving a second cable 4a after a second cable terminator (not illustrated) is inserted through the connection orifice 60. Preferably, the first slit 66b is on a first side of the connection orifice 60, and the second slit 68b is on a second side of the connection orifice 60. The first slit 66b, the second slit 68b, and the connection orifice 60 having centers, wherein the centers are oriented in the same plane as one another. It is further preferred that the plane of the first slit 66b, the second slit 68b and the connection orifice 60 be perpendicular to the ground surface of the ground the post is positioned in.

Figure 7:
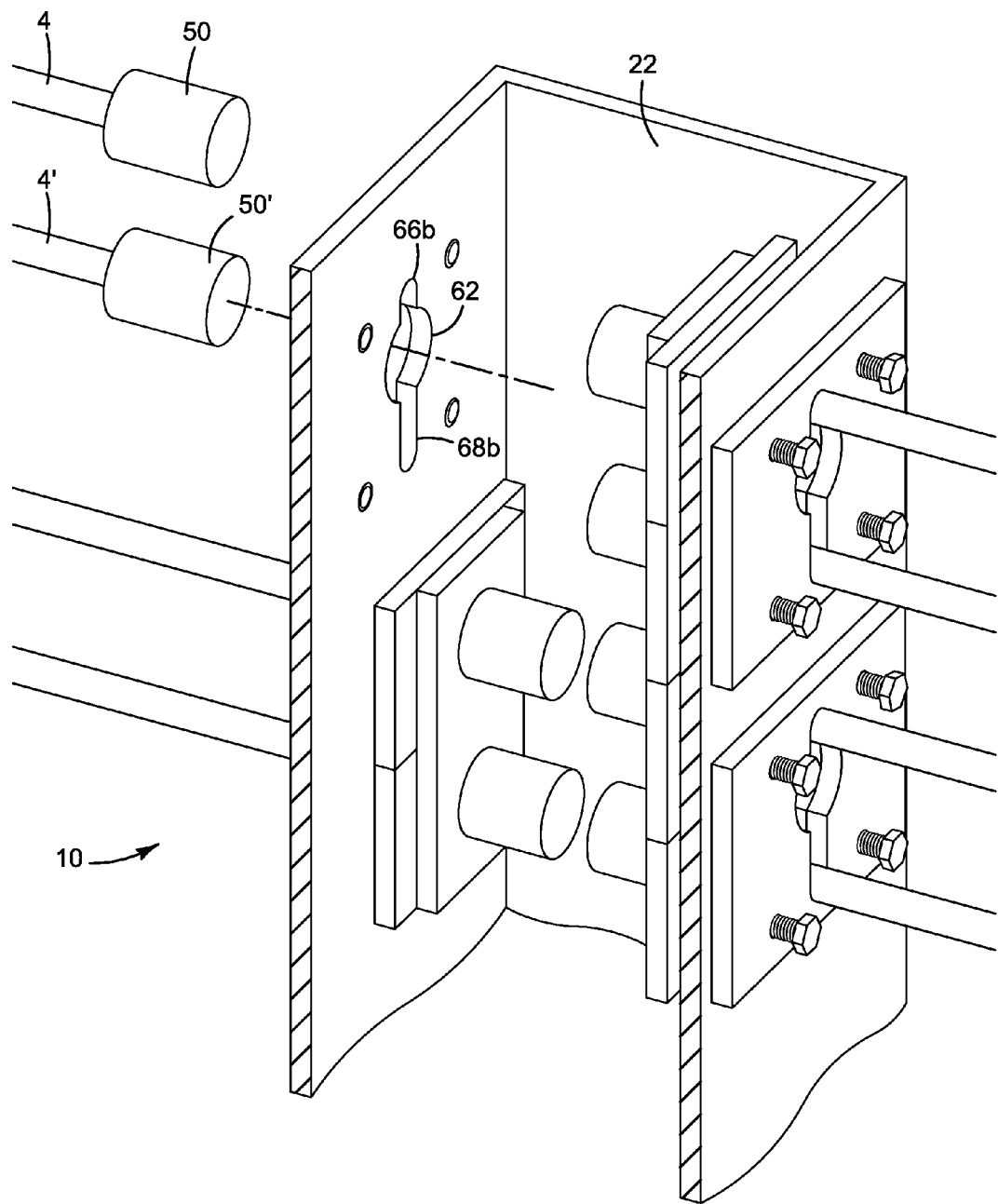
FIG. 7 is a second sequential perspective side view of the fourth exemplary vehicle barrier fence.
Figure 8:
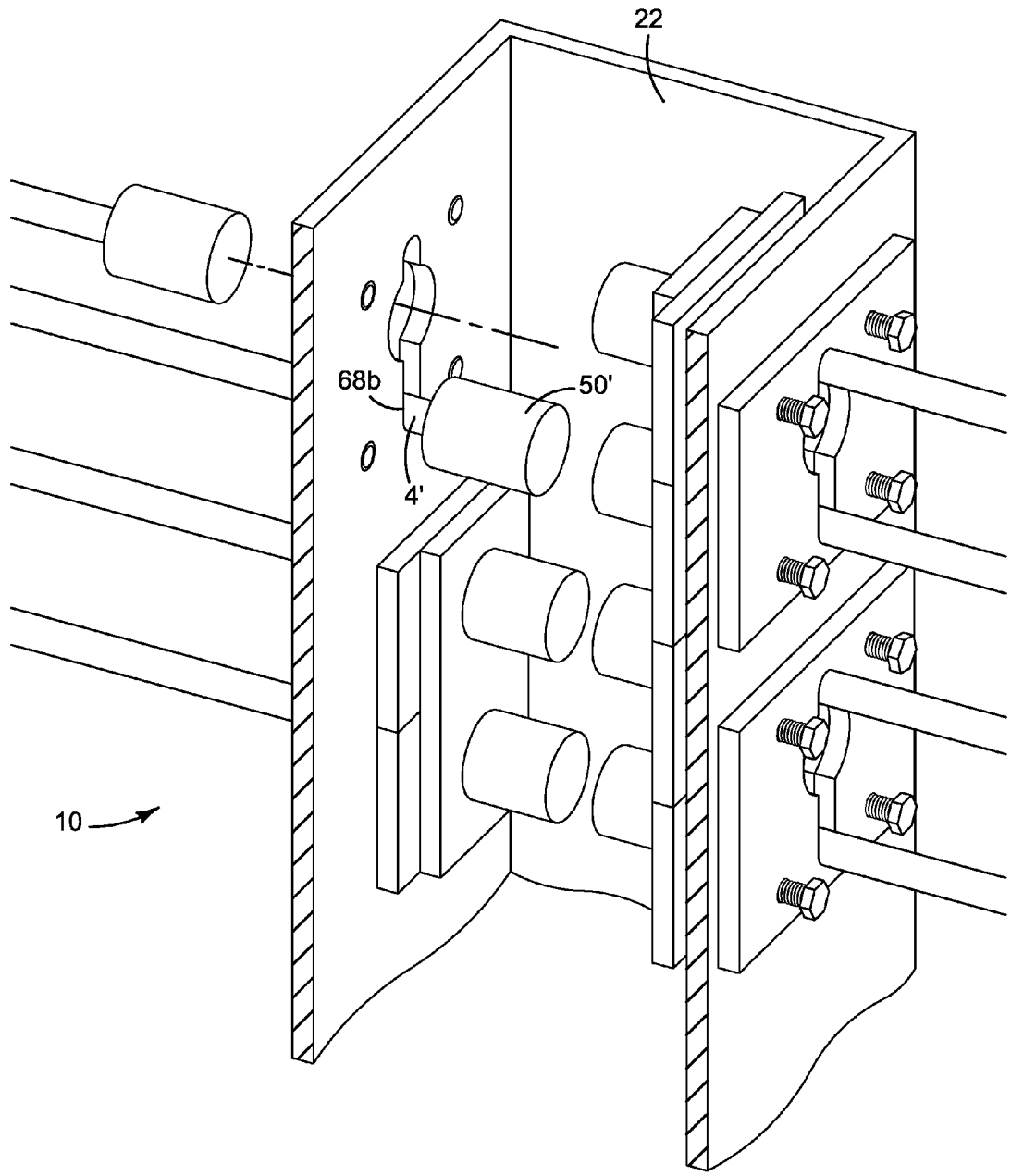
FIG. 8 is a third sequential perspective side view of the fourth exemplary vehicle barrier fence.
Figure 9:
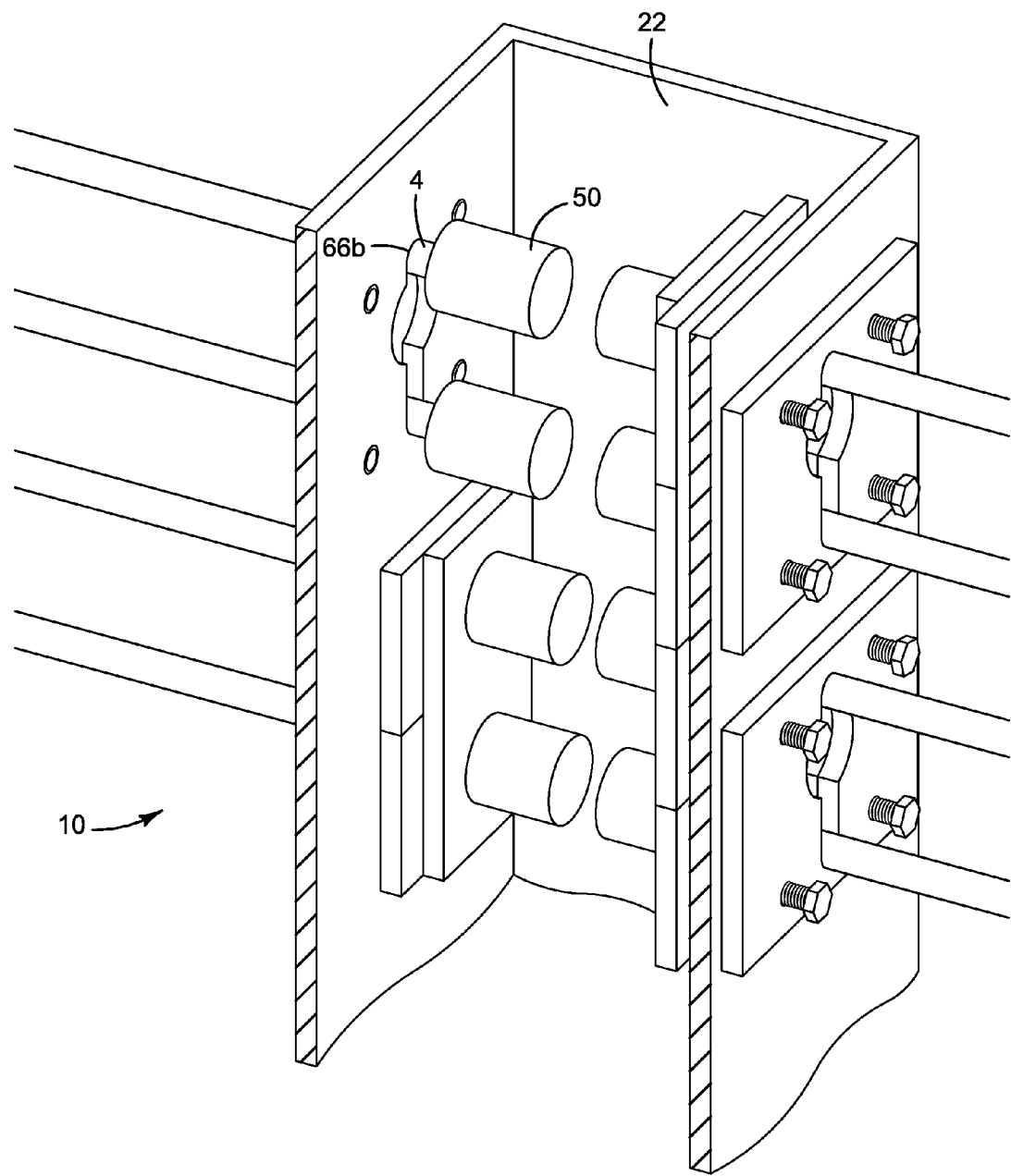
FIG. 9 is a fourth sequential perspective side view of the fourth exemplary vehicle barrier fence.
Figure 10:
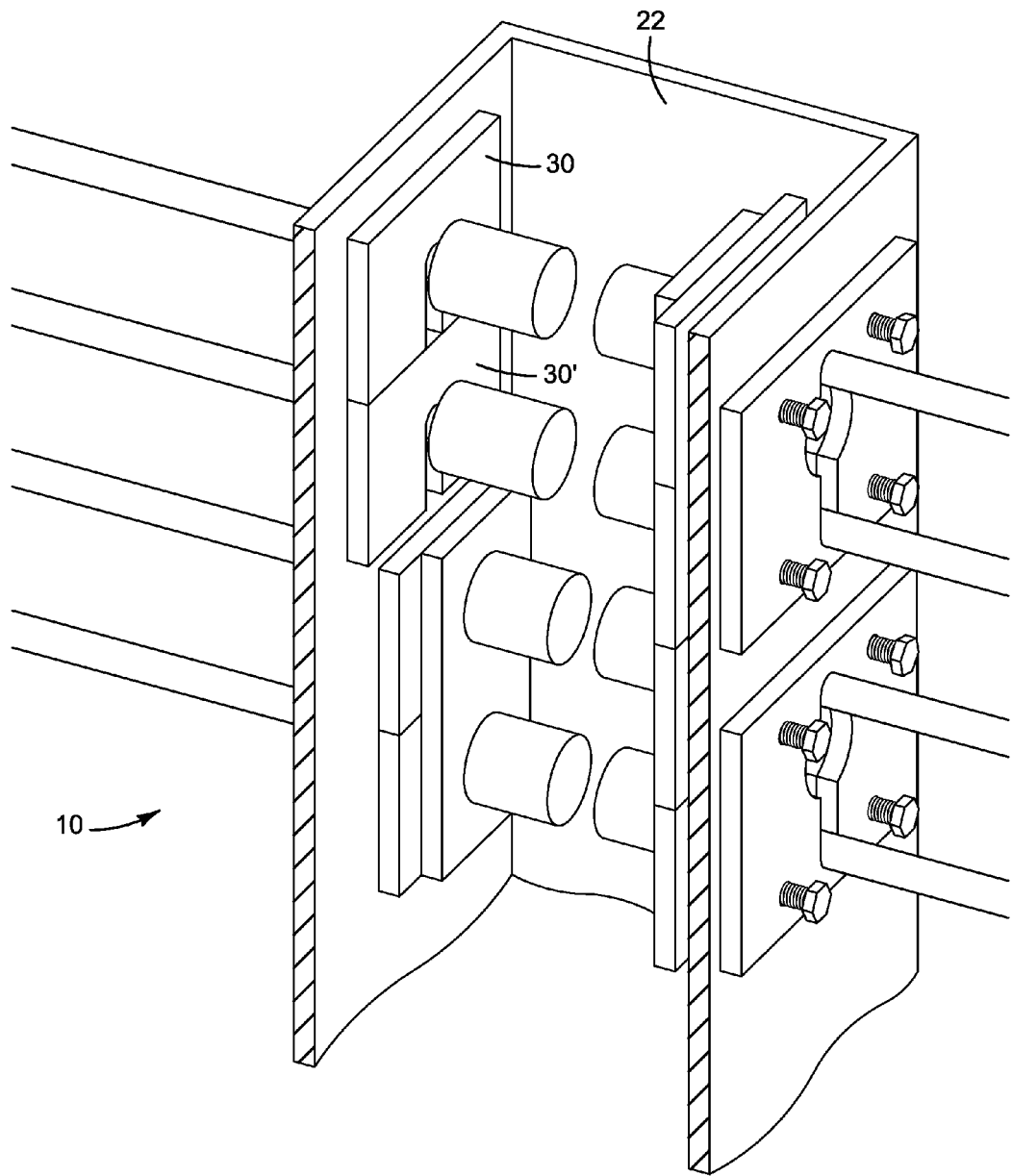
FIG. 10 is a fifth sequential perspective side view of the fourth exemplary vehicle barrier fence.

FIGS. 6 through 11 illustrate the assembly of one exemplary vehicle barrier fence, as it relates to post 22. In FIG. 6, the outer plate 90 of the tensioner 70a would first be slid onto the two cables 4, 4a and moved out of the way. The outer plate 90 having a threaded orifices (92, 92', 93, 93') for alignment with unthreaded orifices (92a, 92b, 93a, 93b). FIGS. 7, 8 and 9 shows the cable terminator 50' of the lower cable 4' ready inserted through the connection orifice 62, followed by the cable terminator 50 of the upper cable 4. The lower cable 4' moved into slit 68b, and the upper cable 4 moved into slit 68. FIG. 10 shows cable retainer 30' being slid over cable 4' thereby locking cable terminator 50' within the post, and cable retainer 30 being slid over cable 4 thereby locking cable terminator 50 within the post. The cable retainers could be added at the same time, or comensurate with the cable terminator being inserted into the post. FIG. 11 shows the tensioner 70a having been slid back into engagement with the post, so that bolts 74, 74', 78, 78' can be turned, spacing the cable terminators 50, 50' away from the inside surface 48b of the first wall 40b, adding tension to the cables 4, 4'. FIG. 12 showing the post with all other structure removed.

Referring now to FIG. 5, illustrated is a center post 22'. The center post 22 having at least one side wall, for instance, first wall 40b. The first wall 40b having at least one connection orifice (not illustrated) defined therethrough. The connection orifice sized for receiving a cable terminator 50 of a cable 4 therethrough. FIG. 5 will be discussed further, in detail, below.

In the exemplary vehicle barrier fence 10 illustrated in the drawings, the connection orifices and the cable terminators have generally cylindrical shapes. In such embodiments, it can be said that the connection orifices have a larger width than the width of the cable terminators. The use of "larger width" or "smaller width" as used herein is not intended to limit the size, shape or configuration of the connection orifices and/or the cable terminators, but is intended to, generally refer to their respective sizes to one another, in general. Alternatively, in other exemplary vehicle barrier fences, the cable terminator has width smaller than the width of the connection orifice.

As illustrated in the drawings, some posts (21, 22) may comprise more than one wall that has a connection orifice defined therethrough. For instance, FIG. 3 illustrates the first wall 40a having a plurality of connection orifices (61, others not illustrated), and second wall 42a having a plurality of connection orifices (not illustrated). FIG. 4 illustrates post 22 having a first wall 40b, a second wall 42b, and connection orifices 62 (others not illustrated) defined in the first wall 40b, with the connection orifices defined in the second wall 42b hidden from view.

The cable retainer 30 retains the cable terminator 50 within the internal cavity (20a, 21a, 22a) of the post (20, 21, 22), keeping the cable terminator 50 from being pulled back out through the connection orifice. Illustrated and described herein, is one embodiment of a cable retainer 30 for preventing the cable terminator 50 from being pulled back out through the connection orifice 60. While this is the preferred cable retainer, a skilled artisan will be able to select an appropriate structure and configuration for a cable terminator in a particular embodiment based on various considerations, including the intended use of the vehicle barrier fence, the intended arena within which the vehicle barrier fence will be used, and the equipment and/or accessories with which the vehicle barrier fence is intended to be used, among other considerations. In other exemplary vehicle barrier fences, the cable could extend through the post and be anchored on the outside of the post, or also in the ground as a dead-man anchor.

The cable retainer 30 described herein, and illustrated in the Figures, including FIGS. 14 and 15, is configured for insertion between the distal end 52 of the cable terminator 50 and the inside surface (48, 48a, 48b, 48c) of the wall. FIG. 14 illustrates a first exemplary cable retainer 30, whereas FIG. 15 illustrates a second exemplary cable retainer 30a. The cable retainer (30, 30a) is preferably configured to be inserted after the cable terminator 50 has been inserted through the connection orifice and into the internal cavity. In other exemplary vehicle barrier fences, the cable retainer (30, 30a) could be added to the cable 4 after the first end 6 of the cable 4 has been inserted through the connection orifice and into the internal cavity. The cable retainer (30, 30a) is utilized to retain the cable terminator 50 within the internal cavity.

The cable retainer (30, 30a) comprises a body having a first side (31, 31a). The first side (31, 31a) comprises a slot (32, 32a) defined therein. The slot (32, 32a) having a slot width larger than the cable width. The slot (32, 32a) further preferably having a slot width narrower than the width of the cable terminator 50. The slot (32, 32a) configured for sliding onto the cable 4 between the distal end 52 of the cable terminator 50 and the inside surface (48, 48a, 48b, 48c) of the post (20, 21, 22, 22a) after the cable terminator 50 has been inserted through the connection orifice. In such a configuration, the cable terminator 50 is prevented from being withdrawn back through the connection orifice.

Preferably, the cable retainer 30 further comprises at least one recess (34, 34a, 36, 36a) defined in the front face (35, 35a) of the cable retainer (30, 30a). The at least one recess can be formed in the cable retainer through any common method, including but not limited to stamping and drilling. The at least one recess (34, 34a, 36, 36a) for receiving a working face of a linear actuator therein, as described in detail below.

The cable retainer 30a illustrated in FIG. 15 further comprising a stiffening flange 33a for further stiffening the cable retainer 30a.

As illustrated in FIG. 17, the cable(s) 4 can comprise wire rope made up of a plurality of strands 8 of wire which may be wrapped around a core 9. FIGS. 17 and 18 illustrate one exemplary cable terminator 50, the exemplary cable terminator 50 comprising a ferrule 56 and one or more wedges (58, 58a). The ferrule 56 illustrated in FIGS. 17 and 18 comprising a generally tubular body configured for receiving the first end 6 of the cable 4 therethrough. Upon the first end 6 of the cable 4 being inserted therethrough, the strands 8 of the cable 4 are splayed and unwound a distance (e.g., 6"), and the strands 8 (and core 9, if present) are mated to the wedge(s). The ferrule 56 is then slid over the mated connection, and seated (e.g., with taps delivered by a hammer) to form the cable terminator 50.

The use of a wedge-ferrule style cable terminator has the benefit of being field installable. To wit, the cables can be cut to a desired length in the field, the cable terminators added thereafter without the need of special tools or skill, and the vehicle barrier fence assembled, all without needing the cables to be created off-site. Such a configuration allows the system to be easily adjustable, for instance, if the field-insertable anchor fitting (the "cable terminator") is installed on the cable in the wrong location, it can be removed and reinstalled. Further, the ends of the cable can be trimmed, if so desired, after the cable terminator is added and the correct length is confirmed.

While a ferrule-wedge style cable retainer is illustrated in the figures, other cable retainers could be utilized in other exemplary barrier fences, included potted ends, poured (spelter) sockets, wire rope clips, wire rope thimbles, open wedge terminations, compression sleeves, swaged terminations, mechanical terminations, and a threaded fitting that utilizes an insert, plug or wedge inserted inside the cable to restrict the fitting from sliding off the end of the cable. For the threaded fittings with inserts, the cable is also splayed, and a spreading device is inserted inside the splayed cable strands. Then, the threaded portion of the body is pulled over the splayed strands and tightened.

The cable terminator 50 is illustrated in the figures as being located at or adjacent the first end 6 of the cable 4. In other exemplary vehicle barrier fences, the cable terminator 50 can be located at other locations along the length of the cable 4. A skilled artisan will be able to select an appropriate cable retainer for use in a particular embodiment based on various considerations, including the intended use of the cable, the intended arena within which the cable will be used, and the equipment and/or accessories with which the cable is intended to be used, among other considerations.

The vehicle barrier fence 10 preferably further comprises a tensioner (70, 70a, 70b) for adding tension to the cable, and removing slack. In FIG. 3, illustrated is a tensioner 70 for spacing the cable terminator 50 away from the inside surface 48a of the post 21, thereby tensioning the cable 4. In FIGS. 4, and 6 through 11, illustrated is a tensioner 70a for spacing the cable terminator 50 away from the inside surface 48b of the post 22, thereby tensioning the cable 4. In FIG. 5, illustrated is a tensioner 70b for spacing the cable terminator 50 away from the inside surface 48c of the post 22, thereby tensioning the cable 4. Any known mechanism or system for separating the two components from one another, thereby tensioning the cable, can be utilized as a tensioner.

A first exemplary tensioner 70a is illustrated in FIGS. 4, and 6 through 11. Tensioner 70a comprising at least one passageway 71 defined through the first wall 40b. The passageway 71 configured for receiving therein a linear actuator configured for spacing the cable terminator 50 away from the inside surface 48b of the post 22, thereby tensioning the cable 4. It is preferred that at least a portion of the passageway be threaded, for instance portion 92, with a portion of the passageway unthreaded, such as portion 92a), and that the linear actuator comprise a threaded shaft. In the tensioner 70a illustrated in these Figures, the linear actuator comprises at least one bolt 74 configured for contacting the cable retainer 30, wherein advancing the bolt 74 through threaded passageway 92 and unthreaded passageway 92a results in the working face of the bolt 74 moving the cable retainer 30 away from the inside surface 48b of the post 22, thereby tensioning the cable 4. In the first exemplary tensioner 70a, the threaded portion 92 is defined in an outside plate 90, and the unthreaded portion 92a comprising a hole drilled through the first wall 40b. Alternatively, the outer plate 90 could be located inside the post 40b.

Preferably, the tensioner 70a further comprises a second passageway 76 defined through the first wall 40b. The second passageway 76 configured for receiving therein a second linear actuator configured for spacing the cable terminator 50 away from the inside surface 48b of the post 22. It is further preferred at least a portion of the second passageway 76 be threaded, for instance portion 93a, and that a second linear actuator comprise a threaded shaft. The second linear actuator comprises at least one bolt 78 configured for contacting the cable retainer 30, wherein advancing the bolt 78 through threaded passageway 93 results in the working face of the bolt 78 moving the cable retainer 30 away from the inside surface 48b of the post 22, thereby tensioning the cable 4. In the first exemplary tensioner 70a, the threaded portion 93 is defined in an outer plate 90, and the unthreaded portion 93a comprising a hole drilled through the first wall 40b. Alternatively, the outer plate 90 could be located inside the post 40b.

In the first exemplary tensioner 70a illustrated in FIGS. 4, and 6 through 11, the outside plate 90 (also illustrated in FIG. 16) is fixed to the outside surface of the post 22. The outside plate 90 having at least one threaded orifice 92 defined therethrough which is aligned with an unthreaded orifice 92a, so that a bolt 74 inserted into the threaded orifice 92 can be advanced through the unthreaded orifice 92a and can be brought into contact with the cable retainer 30, thereby tensioning the cable.

Again, alternatively, one or more of the linear actuators (e.g., bolt) could contact the cable terminator 50 instead of the cable retainer 30, or another structure, thereby adding the desired tension.

In the second exemplary tensioner 70*b* illustrated in FIG. 5, tensioner 70*b* comprises at least one passageway defined through the first wall 40*z*. The passageway configured for receiving therein a linear actuator configured for spacing the cable terminator 50 away from the inside surface 48*c* of the post 22', thereby tensioning the cable 4. It is preferred that at least a portion of the passageway be threaded, for instance portion 92*z* (93*z*), and that the linear actuator comprise a threaded shaft. In the tensioner 70*b* illustrated in this Figure, the linear actuator comprises at least one bolt 174 (175) configured for contacting the cable retainer 30, wherein advancing the bolt 174 (175) through threaded passageway 92*z* (93*z*) results in the working face of the bolt 174 (175) moving the cable retainer 30 away from the inside surface 48*c* of the post 22', thereby tensioning the cable 4.

Only one tensioner is needed for each cable, but in some embodiments a tensioner may be located at both ends of the cable, one in each post.

To tension the cable, the installer can utilize a cordless electric drill, impact wrench, or other such device, to alternately advance the first and second bolts until the desired tension is obtained. When the desired tension is obtained, the tensioner can be left "as is," the heads of the bolts can be ground off, or (after concrete poured inside the internal cavity hardens) the bolts can be removed.

Another exemplary tensioner comprises pulling the cable taut, thereby moving the cable retainer away from the inside surface of the post, and inserting spacers between the cable retainer and the inside surface of the post, thereby tensioning the cable 4.

Referring now to FIG. 13, illustrated is a saddle plate 88 for connecting with adjacent cable terminators 50 after installation, and positioning them a predetermined space apart. The illustrated saddle plate 88 comprising a plate 89 having a first cable terminator orifice 86 and a second cable terminator orifice 87. The saddle plate 88 keeps the cable terminators 50 from moving toward the connection orifices after installation.

Referring now to FIG. 19, illustrated is the use of one or more lateral stiffeners 80, 82. The lateral stiffeners 80 illustrated in this Figure can comprising a plate having an orifice defined there through which is generally the outside shape of the post 20 the lateral stiffener(s) is installed on, creating a general ring shape comprising a plurality of outer flanges. Alternatively, an exemplary lateral stiffener could comprise a partial ring shapes, such as partial ring stiffener 85.

The lateral stiffeners can be attached through any known method, including welding. While FIG. 19 illustrates one lateral stiffener placed above and below each cable, in other exemplary posts, only the upper most cable or cables will need lateral stiffener placed above and/or below the cable.

For use with a post having ½" thick sidewalls, the lateral stiffeners could be ½" thick, having an outer flange 2" wide. A skilled artisan will be able to select an appropriate thickness and outer flange width in a particular embodiment based on various considerations, including the intended use of the post, the intended arena within which the post will be used, and the equipment and/or accessories with which the post is intended to be used, among other considerations.

It is preferred that the lateral stiffeners be attached to the post during fabrication of the post, and not in the field. However, lateral stiffeners can be later installed to the post after the cables have been attached, for instance through welding.

In another exemplary vehicle barrier fence, after the cables are tensioned, at least a portion of the internal cavity is filled with concrete. Preferably a plate is added to the outside of the post covering the keyhole, or the keyhole is filled, so as to prevent concrete from pouring out of the keyhole. The concrete locks in the tension by permanently spacing the cable terminator from the wall of the post, and helps dissipate force in the event of an impact.

A first exemplary method of installing a vehicle barrier fence comprises the steps of: providing two posts (a first post and a second post) anchored to a ground surface, the posts each having an internal cavity; the posts each having a connection orifice (a first connection orifice and a second connection orifice) in a first side wall; measuring the distance between two adjacent posts; determining a cable length; cutting a cable to the cable length, the cable having a first end and a second end; installing a first cable terminator on the first end of the cable; installing a second cable terminator on the second end of the cable; inserting the first cable terminator through the first connection orifice and into the first post's internal cavity; locking the first cable terminator via a first cable retainer; inserting the second cable terminator through the second connection orifice and into the second post's internal cavity; locking the first cable terminator via a first cable retainer; and using a tensioner to tension the cable.

A second exemplary method of installing a vehicle barrier fence comprises the steps of: providing two posts (a first post and a second post) anchored to a ground surface, the posts each having an internal cavity; the posts each having a connection orifice (a first connection orifice and a second connection orifice) in a first side wall; measuring the distance between two adjacent posts; determining a cable length; cutting a cable to the cable length, the cable having a first end and a second end; installing a first cable terminator on the first end of the cable; installing a second cable terminator on the second end of the cable; inserting the first cable terminator through the first connection orifice and into the first post's internal cavity; locking the first cable terminator via a first cable retainer; inserting the second cable terminator through the second connection orifice and into the second post's internal cavity; locking the first cable terminator via a first cable retainer; using a tensioner to tension the cable, and filling the internal cavities with concrete.

It is noted that all structure and features of the various described and illustrated embodiments can be combined in any suitable configuration for inclusion in a vehicle barrier fence according to a particular embodiment. For example, a vehicle barrier fence according a particular embodiment can include neither, one, or both of stiffener ring and the tensioner described above.

Any suitable materials can be used to form the various components of an exemplary vehicle barrier fence, and a skilled artisan will be able to select appropriate materials for a vehicle barrier fence according to a particular embodiment based on various considerations, including the environment within which the vehicle barrier fence is intended to be used. The inventors have determined that metal materials are suitable for use in the various components of the vehicle barrier fence. For example, the posts, cable retainers, and cable terminators can be formed from metal materials, including steel and other suitable metals. Materials hereinafter discovered and/or developed that are determined to be suitable for use in vehicle barrier fence devices would also be considered suitable for use in a vehicle barrier fence according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A vehicle barrier fence for arresting an impacting vehicle of substantial mass within a selected distance of the fence, the fence comprising:
   a retaining structure;
   a cable having a first width, said cable having a first end extending to a second end, said second end configured to be fixed to said retaining structure, said first end comprising a cable terminator having a second width, wherein the second width is greater than said first width, said cable terminator having a proximal end and a distal end, wherein said proximal end is nearer said second end than said distal end is to said second end;
   a post positioned in and secured to a ground surface, said post in a spaced apart relationship from said retaining structure, said post comprising an internal cavity, said post having a first wall having a connection orifice defined therethrough for receiving said cable terminator therethrough, said connection orifice larger than said second width, said first wall comprising an outside surface and an inside surface; and
   a cable retainer configured for insertion between said distal end and said inside surface after said cable terminator has been inserted through said connection orifice and into said internal cavity, said cable retainer for retaining said cable terminator within said internal cavity.

2. The vehicle barrier fence of claim 1, wherein said retaining structure comprises a second post.

3. The vehicle barrier fence of claim 1, further comprising a tensioner for spacing the cable terminator away from the inside surface of the post, thereby tensioning the cable.

4. The vehicle barrier fence of claim 3, wherein after said cable is tensioned, at least a portion of said internal cavity is filled with concrete.

5. The vehicle barrier fence of claim 1, wherein said cable retainer comprises a body having a first side, said first side comprising a slot defined therein, said slot having a width larger than said first width, said slot having a width narrower than said second width, said slot configured for sliding onto said cable between said cable terminator distal end and said post inside surface after said cable terminator has been inserted through said connection orifice and into said internal cavity thereby retaining said cable terminator within said internal cavity.

6. The vehicle barrier fence of claim 1, wherein said cable retainer comprises at least one recess configured for receiving a working face of a linear actuator therein.

7. The vehicle barrier fence of claim 1, wherein said post further comprises a first slit defined through said first wall, said first slit having a width wider than said first width, said first slit having a width narrower than said second width, and said first slit configured for receiving the cable after the cable terminator is inserted through said connection orifice.

8. The vehicle barrier fence of claim 7, wherein said post further comprises a second slit defined through said first wall, said second slit having a width wider than said first width, said second slit having a width narrower than said second width, and said second slit configured for receiving a second cable after a second cable terminator is inserted through said connection orifice.

9. The vehicle barrier fence of claim 8, wherein said first slit is on a first side of said connection orifice, wherein said first slit comprises a center, said connection orifice having a center, wherein the centers of said first slit and said connection orifice are oriented in the same plane as one another.

10. The vehicle barrier fence of claim 9, wherein said the plane of the first slit and the connection orifice is perpendicular to said ground surface.

11. The vehicle barrier fence of claim 10, further comprising:
   a second cable having a first width, said second cable having a first end extending to a second end, said second end configured to be fixed to said retaining structure, said first end comprising a second cable terminator having a second width, wherein the second width is greater than said first width, said second cable terminator having a proximal end and a distal end, wherein said proximal end is nearer said second end than said distal end is to said second end; and
   a second cable retainer configured for insertion between said second cable terminator distal end and said inside surface after said second cable terminator has been inserted through said connection orifice and into said internal cavity, said second cable retainer for retaining said cable terminator within said internal cavity.

12. The vehicle barrier fence of claim 11, wherein said second cable retainer comprises a body having a first side, said first side comprising a slot defined therein, said slot having a width larger than said first width, said slot having a width narrower than said second width, said slot configured for sliding onto said cable between said second cable terminator distal end and said post inside surface after said second cable terminator has been inserted through said connection orifice and into said internal cavity thereby retaining said second cable terminator within said internal cavity.

13. The vehicle barrier fence of claim 12, further comprising a tensioner for spacing the second cable terminator away from the inside surface of the post, thereby tensioning the second cable.

14. The vehicle barrier fence of claim 13, further comprising a saddle plate connecting with said cable terminators and positioning them a predetermined space apart.

15. The vehicle barrier fence of claim 1, wherein said ferrule comprises a generally tubular body configured for receiving the first end of the cable therethrough.

16. The vehicle barrier fence of claim 15, wherein said cable comprises a plurality of strands, and wherein upon the first end of said cable being inserted through said generally tubular body, said strands are splayed and unwound.

17. The vehicle barrier fence of claim 16, wherein said wedge block is configured for mating with said unwound strands, wherein upon said wedge block being mated with said unwound strands, said ferrule is slid over the mated connection and seated to form said cable terminator.

18. The vehicle barrier fence of claim 1, wherein said cable terminator comprises a ferrule, and a pair of wedge blocks, wherein said ferrule comprises a generally tubular body configured for receiving the first end of the cable therethrough, wherein said cable comprises a plurality of strands, and wherein upon the first end of said cable being inserted through said generally tubular body, said strands of said first end are splayed and unwound, wherein said wedge blocks are configured for mating with said unwound strands, wherein upon said wedge blocks being mated with said unwound strands, said ferrule is slid over the mated connection, and seated to form said cable terminator.

19. A vehicle barrier fence for arresting an impacting vehicle of substantial mass within a selected distance of the fence, the fence comprising:

a retaining structure;
a cable having a first width, said cable having a first end extending to a second end, said second end configured to be fixed to said retaining structure, said first end comprising a cable terminator having a second width, wherein the second width is greater than said first width, said cable terminator having a proximal end and a distal end, wherein said proximal end is nearer said second end than said distal end is to said second end;
a post positioned in and secured to a ground surface, said post in a spaced apart relationship from said retaining structure, said post comprising an internal cavity, said post having a first wall having a connection orifice defined therethrough for receiving said cable terminator therethrough, said connection orifice larger than said second width, said first wall comprising an outside surface and an inside surface, wherein said cable terminator comprises a ferrule and at least one wedge block;
a cable retainer configured for insertion between said distal end and said inside surface after said cable terminator has been inserted through said connection orifice and into said internal cavity, said cable retainer for retaining said cable terminator within said internal cavity; and
a tensioner for spacing the cable terminator away from the inside surface of the post, thereby tensioning the cable.

20. A vehicle barrier fence for arresting an impacting vehicle of substantial mass within a selected distance of the fence, the fence comprising:

a retaining structure;
a cable having a first width, said cable having a first end extending to a second end, said second end configured to be fixed to said retaining structure, said first end comprising a cable terminator having a second width, wherein the second width is greater than said first width, said cable terminator having a proximal end and a distal end, wherein said proximal end is nearer said second end than said distal end is to said second end;
a post positioned in and secured to a ground surface, said post in a spaced apart relationship from said retaining structure, said post comprising an internal cavity, said post having a first wall having a connection orifice defined therethrough for receiving said cable terminator therethrough, said connection orifice larger than said second width, said first wall comprising an outside surface and an inside surface; and
a cable retainer configured for insertion between said distal end and said inside surface after said cable terminator has been inserted through said connection orifice and into said internal cavity, said cable retainer for retaining said cable terminator within said internal cavity; and
a tensioner for spacing the cable terminator away from the inside surface of the post, thereby tensioning the cable, wherein after said cable is tensioned, at least a portion of said internal cavity is filled with concrete.

* * * * *